(12) United States Patent
Gaber et al.

(10) Patent No.: US 11,361,366 B2
(45) Date of Patent: Jun. 14, 2022

(54) METHOD, COMPUTER PROGRAM PRODUCT, AND APPARATUS FOR WORKSPACE RECOMMENDATIONS BASED ON PRIOR USER RATINGS AND SIMILAR SELECTIONS

(71) Applicant: EMC IP Holding Company LLC, Hopkinton, MA (US)

(72) Inventors: Shiri Gaber, Beer Sheva (IL); Avitan Gefen, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 3 days.

(21) Appl. No.: 16/589,349

(22) Filed: Oct. 1, 2019

(65) Prior Publication Data

US 2021/0097596 A1 Apr. 1, 2021

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0627* (2013.01); *G06Q 30/0629* (2013.01); *G06Q 30/0643* (2013.01)

(58) Field of Classification Search
CPC . G06Q 30/0623–0629; G06Q 30/0631; G06Q 30/0601–0645; G06Q 30/08
See application file for complete search history.

(56) References Cited

U.S. PATENT DOCUMENTS 8,732,101 B1 * 5/2014 Wilson ............... G06F 16/9535
706/15
10,289,966 B2 5/2019 Daher et al.
(Continued)

OTHER PUBLICATIONS

Sharma, Mrudul. "'I'Ve Closely Followed the Co-Working Space for almost a Decade and I'Ve been Monitoring this Industry Worldwide'—Sudeep Singh, CEO, GoWork." Business World Sep. 27, 2019.ProQuest. Web. Dec. 17, 2020 . (Year: 2019).*
(Continued)

*Primary Examiner* — Jeffrey A. Smith
*Assistant Examiner* — Kennedy Gibson-Wynn
(74) *Attorney, Agent, or Firm* — Ryan, Mason & Lewis, LLP

(57) ABSTRACT

Techniques are provided for generating workspace recommendations based on prior user ratings of selected workspaces, as well as other similar selections. One method comprises obtaining user workspace ratings provided by a user; calculating a first workspace recommendation score for workspaces that the user previously rated based on the obtained user workspaces ratings; calculating a second workspace recommendation score for additional workspaces that are: (i) similar to workspaces previously rated by the user based on a predefined workspace similarity metric, and/or (ii) selected by similar users, based on a predefined user similarity metric; and recommending workspaces for the user based on the first workspace recommendation score and the second workspace recommendation score. The first workspace recommendation score can be further based on a number of times the user selected a given workspace, an average number of times the user selected different workspaces, and/or an average score that the user previously assigned the given workspace.

20 Claims, 8 Drawing Sheets

(56) References Cited

U.S. PATENT DOCUMENTS

| | | | | |
|---|---|---|---|---|
| 2010/0169340 | A1* | 7/2010 | Kenedy | G06Q 30/02 |
| | | | | 707/758 |
| 2014/0351079 | A1* | 11/2014 | Dong | G06Q 30/0631 |
| | | | | 705/26.7 |
| 2015/0220836 | A1* | 8/2015 | Wilson | H04L 67/18 |
| | | | | 706/46 |
| 2016/0300144 | A1* | 10/2016 | Santhanam | G06Q 30/0631 |
| 2019/0065564 | A1* | 2/2019 | Twig | G06F 17/30554 |
| 2019/0340537 | A1* | 11/2019 | Fung | G06N 20/00 |
| 2020/0311635 | A1* | 10/2020 | Emig | G06Q 30/0627 |
| 2020/0334737 | A1* | 10/2020 | Miller | G06Q 30/0631 |

OTHER PUBLICATIONS

Chen, Li, Guanliang Chen, and Feng Wang. "Recommender Systems Based on User Reviews: The State of the Art." User Modeling and User-Adapted Interaction 25.2 (2015): 99-154. ProQuest. Web. Oct. 26, 2021. (Year: 2015).*

Kluver, Daniel Allen. "Improvements in Holistic Recommender System Research." Order No. 10933973 University of Minnesota, 2018. Ann Arbor: ProQuest. Web. Jan. 25, 2022. (Year: 2018).*

"Dynamic, Adaptable Workspace that Inspires Workers", downloaded on Sep. 25, 2019 from https://info.osram.us/blog/dynamic-adaptable-workspace-that-inspires-workers.

Shellenbarger, Sue, "Don't Get too Used to Your Own Desk", downloaded on Sep. 25, 2019 from https://www.wsj.com/articles/dont-get-too-used-to-your-own-desk-1526390258.

Melville et al., "Recommender Systems", Encyclopedia of Machine Learning, Chapter No. 00338, pp. 1-9 (Apr. 22, 2010).

Feintzeig, Rachel, "The New Science of Who Sits Where at Work", downloaded from https://www.wsj.com/articles/no-headline-available-1381261423.

"Report: Remote Work Can Bring Benefits, but Attitudes are Divided", downloaded on Sep. 25, 2019 from http://blog.indeed.com/2018/11/14/remote-work-survey/.

* cited by examiner

METHOD, COMPUTER PROGRAM PRODUCT, AND APPARATUS FOR WORKSPACE RECOMMENDATIONS BASED ON PRIOR USER RATINGS AND SIMILAR SELECTIONS

FIELD

The field relates generally to information processing, and more particularly, to workspace allocation techniques.

BACKGROUND

Companies are often looking for new ways to improve their operations. Many companies reduce costs, for example, by encouraging workers to work fully or partially from home, often significantly reducing real estate costs. This trend is expected to continue to rise. In a workspace where workers do not come to the office on a regular basis, there is a need for an efficient solution to allow workers to reserve a suitable workspace for a period of time, such as a given day or a portion of a day.

SUMMARY

In one embodiment, a method comprises obtaining one or more user workspace ratings that a user previously provided for one or more workspaces; calculating a first workspace recommendation score for at least some of the workspaces that the user previously rated based on the obtained one or more user workspaces ratings; calculating at least a second workspace recommendation score for one or more additional workspaces that are one or more of: (i) similar to workspaces previously rated by the user, based on a predefined workspace similarity metric, and (ii) selected by one or more similar users, based on a predefined user similarity metric; and recommending one or more workspaces for the user based at least in part on the first workspace recommendation score and the second workspace recommendation score.

In some embodiments, the first workspace recommendation score for at least some of the workspaces that the user previously rated is further based on one or more of a number of times the user selected a given workspace, an average number of times the user selected different workspaces, and an average score that the user previously assigned the given workspace. The second workspace recommendation score for the one or more additional workspaces that are similar to workspaces previously rated by the user may evaluate workspaces having a first workspace recommendation score above a predefined threshold and identify the one or more additional workspaces using the predefined workspace similarity metric. The second workspace recommendation score for the one or more additional workspaces selected by the one or more similar users, based on the predefined user similarity metric, may be identified using one or more collaborative filters.

Other illustrative embodiments include, without limitation, apparatus, systems, methods and computer program products comprising processor-readable storage media.

DETAILED DESCRIPTION

Figure 1:
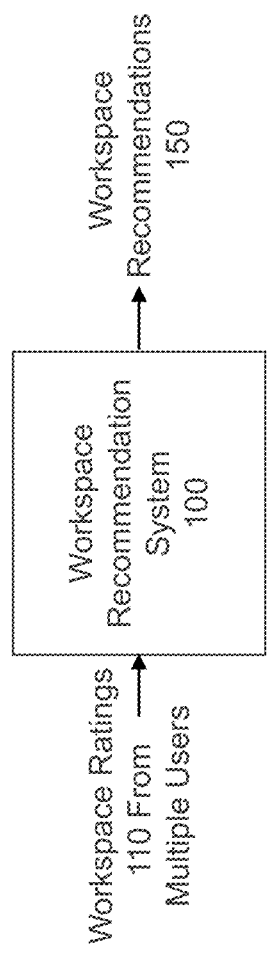
FIG. 1 illustrates a workspace recommendation system that generates a weighted workspace scoring for a given user, according to at least one embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for generating workspace recommendations based on prior user ratings of selected workspaces, as well as other similar selections.

One or more embodiments of the present disclosure provide efficient workspace recommender systems and methods to allow workers to reserve a suitable workspace for any given day or portion of a day. In some embodiments, the disclosed solution balances constraints and user preferences to preserve productivity and satisfaction.

In some embodiments, a machine learning-based approach is provided for automatically recommending seating, based on personal preferences of workers, such as a particular building, direction, floor, department and more. The disclosed workspace recommendation solution will improve over time based on user feedback and an exploration-exploitation mechanism to preserve a high user satisfaction.

Among other benefits, the disclosed workspace recommendation system can provide significant cost savings and improve the experience and productivity of employees and other users of a workspace.

Companies are often looking for new ways to improve their operations. One way to improve operations, for example, is to encourage employees to work from home and save on the costs of enterprise facilities, in addition to sparing the commute time for the employee. One particular enterprise company estimates a savings of approximately $12M per year in real estate costs by encouraging employees to work from home, and has established a goal of having 50% of its employees and other workers working from home at least a few days a week by 2020.

This new enterprise approach leads to a more dynamic work place, with workspaces dynamically assigned to employees, as needed. In some companies, there are no assigned seats at all. Instead, employees and other workers must reserve a workspace every day (e.g., a desk, office, quiet pod or meeting room), based on the type of work that the worker needs to do that day. This approach has been referred to as hoteling or "beach toweling," which is becoming more common in the modern business world.

It is well known that seating arrangement holds a large impact on the productivity of employees. For example, mixing employees from different departments and role titles in a given workspace has been shown to lead to higher innovation. Yet managing the workspace pool and personalizing the workspace pool to needs of each employee is a challenging and time-consuming task, especially for large organizations.

One or more embodiments of the present disclosure provide a machine learning-based approach for automatically assigning workers to workspaces (e.g., specific seats, work rooms, conference rooms and/or flexible workspaces) based on the personal preferences of each worker, as well as an employer strategy, for example, as embodied in one or more workspace assignment policies.

In some embodiments, in a preliminary stage, workspaces are suggested for a given user based on a questionnaire completed by each employee to specify one or more preferred features of their desired work location, such as building, direction, floor, department and more. Over time, the provided suggestions are improved based on the user-provided satisfaction scores after each workspace assignment. Available workspace options are optionally presented to the employee in a sorted manner according to his/her past scores.

In order to provide a representative set of example workspaces, as well as to incorporate a company strategy, the list of workspace suggestions provided in one or more embodiments includes options not yet experienced by a given user, in some embodiments, in order to increase an exploitation vs. exploration tradeoff for workspace assignments.

Companies are seeking to acquire a talented workforce. With prior approaches, employees were often required to swipe their employee card when they arrive at a company site for a work day and when they leave at the end of a work day. This approach made it difficult, if not impossible, for potential employees with a large commute time and/or limited availability (e.g., working parents and freelancers) to be effective and to fully realize their potential. Over time, the life of working professionals is becoming more dynamic and increasing vehicular traffic is adding to the commute time in many regions. This increases the need for a new approach to allow for remote connections and an availability that is not necessarily physical. This trend is being adopted by an increasing number of organizations around the world.

In a dynamic workplace, where workers are dynamically assigned workspaces as needed, one naive approach is to assign employees with random seats. It can be shown, however, that personalized work environments that are specifically assigned to employees, based on their preferences, can have a significant affect both on the employee level of satisfaction as well on employee productivity. For example, assigning an employee whose job requires meticulous concentration with a noisy location in a crowded open space will have a devastating effect on his or her efficiency and productivity. On the other hand, if a company suffers from a lack of innovation and wants to push its employees to extract their creativity, mixing different role jobs and departments can be a good idea. In many cases, taking the preferences of employees into consideration aligns and enhances company strategy.

With the improvements in available network speed, teleconferencing and the beginning of virtual reality applications, arriving and utilizing a common physical workspace on a daily basis is simply wasteful. Some of the immediate costs associated with the daily presence and use of facilities by employees are real estate costs, network and connectivity costs, electricity and other utility costs, insurance costs, and/or food and beverage costs (e.g., tea and coffee). An employee that works from home for at least a portion of the week "saves" the company working hours lost on commute time, planned breaks and unplanned "corridor encounters."

A manual assignment of workspaces to employees can be a meticulous and time-consuming task, as it needs to take multiple limitations into account. Workspace availability, location, and surrounding role titles are only some of these limitations. At large company sites, for example, where the number of employees can reach thousands, this daily task can heavily consume corporate resources and become virtually impossible when approached manually (thus, some level of automation is needed).

FIG. 1 illustrates a workspace recommendation system 100 that generates a weighted workspace scoring for a given user, according to at least one embodiment. As shown in FIG. 1, workspace ratings 110 from multiple users, including the given user, are applied to the workspace recommendation system 100. The exemplary workspace recommendation system 100 generates workspace recommendations 150 based on prior workspaces rating 110 of selected workspaces by the given user, as well as other similar selections, as discussed further below.

Figure 2:
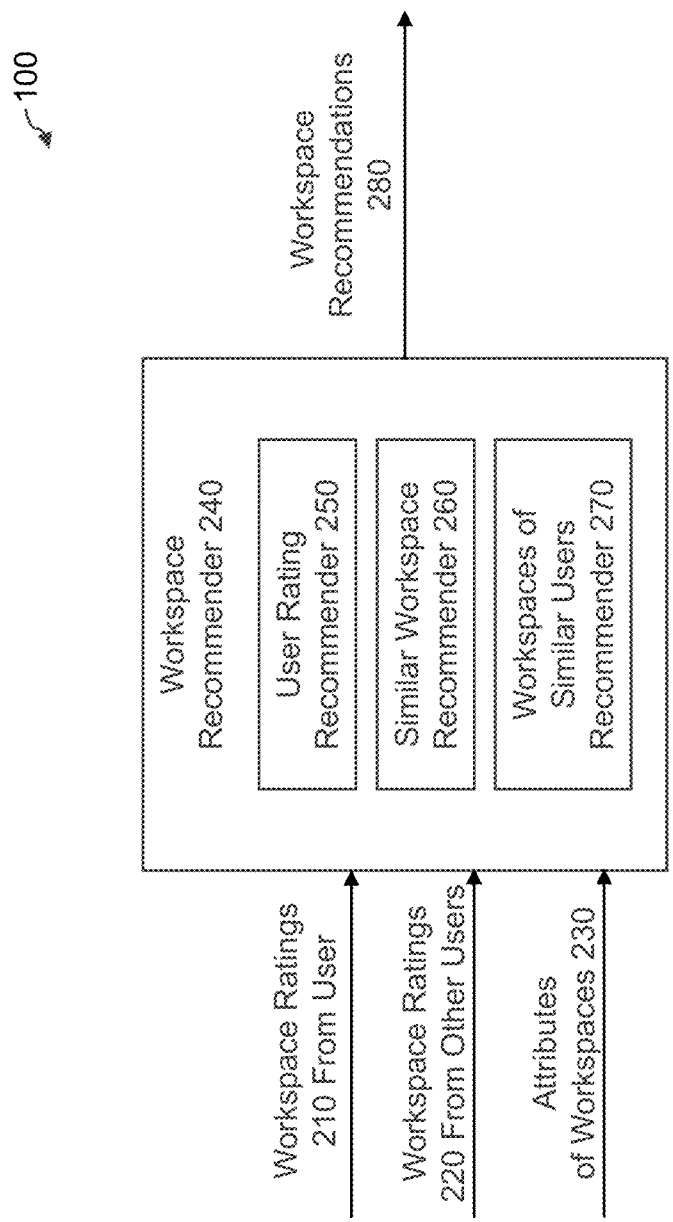
FIG. 2 illustrates the workspace recommendation system of FIG. 1 in further detail, according to some embodiments of the disclosure.

FIG. 2 illustrates the workspace recommendation system 100 of FIG. 1 in further detail, according to some embodiments of the disclosure. In the example of FIG. 2, workspace ratings 210 from the given user, workspace ratings 220 from other users, and attributes of the workspaces 230 are applied to a workspace recommender 240 that generates workspace recommendations 280.

The exemplary workspace recommender 240 comprises a user rating recommender 250, a similar workspace recommender 260 and a workspaces of similar users recommender 270.

In one or more embodiments, the user rating recommender 250 generates tailored workspace recommendations for a given user based on workspaces that were rated by the given user in the past. In one embodiment, a weighted workspace score is determined by the user rating recommender 250, as follows:

$$WS_i = (v_i/(v_i+m)) \times R_i + (m/(v_i+m)) \times C \quad (1)$$

where $WS_i$ is the weighted score of workspace i, $v_i$ is the number of times that the given user voted for workspaces i, m is the average number of votes the given user placed for different workspaces so far, $R_i$ is the average score that the given user gave workspaces i in the past and C is the average score over all past votes of the given user. In this manner, equation (1) takes into account the number of times the user favored the same workspace.

In the example of FIG. 2, the exemplary similar workspace recommender 260 generates tailored workspace recommendations for the given user using one or more additional workspaces that are similar to workspaces previously rated by the given user, based on a predefined workspace similarity metric (e.g., workspaces that were not yet rated by the given user but have a high similarity to previously chosen workspaces).

In one exemplary implementation, the similar workspace recommender 260 processes workspaces previously rated by the given user that have a weighted score according to equation (1) above a predefined threshold. The similar workspace recommender 260 then identifies additional workspaces that are similar to the identified previously rated workspaces using a predefined workspace similarity metric, such as a Jaccard similarity score on the set of additional workspaces and their corresponding workspace attributes 230, such as building, direction, floor and department.

For example, the exemplary similar workspace recommender 260 can determine a similar workspace weighted score, as follows:

$$WS_j = S_{i,j} \times WS_i \qquad (2)$$

where $WS_j$ is the similar workspace, and $S_{i,j}$ is the similarity score between the workspaces. If the same workspace gets several similar $WS_j$ scores, then a maximum similar $WS_j$ score can be selected in at least one embodiment.

In the example of FIG. 2, the exemplary workspaces of similar users recommender 270 generates tailored workspace recommendations for the given user using one or more additional workspaces that were selected by one or more users that are similar to the given user, based on a predefined user similarity metric (e.g., highly rated seats by similar users), for example, using user-based collaborative filtering, as discussed further below in conjunction with FIG. 4.

User-based collaborative filtering is a known method for generating recommendations for a user with items that similar users previously liked. The exemplary workspaces of similar users recommender 270 can determine a workspace of similar users weighted score, as follows:

$$WS_i = \frac{\Sigma(R_{v,i} \times S_{u,v})}{S_{u,v}}, \qquad (3)$$

where $R_{v,i}$ is the rating given by a user v to the workspace i, and $S_{u,v}$ is the similarity score between users. Similarity of users can be calculated, for example, using a predefined user similarity metric, such as a Pearson correlation. In one exemplary implementation, the recommendations can be limited to those users with a predefined user similarity metric greater than a predefined threshold.

A final workspace recommendation score for a given workspace, in the event that a weighted score that comes from more than one of the workspace recommender 240, user rating recommender 250 and similar workspace recommender 260, can be selected, for example, as a maximum of the available workspace recommendation scores.

Figure 3:
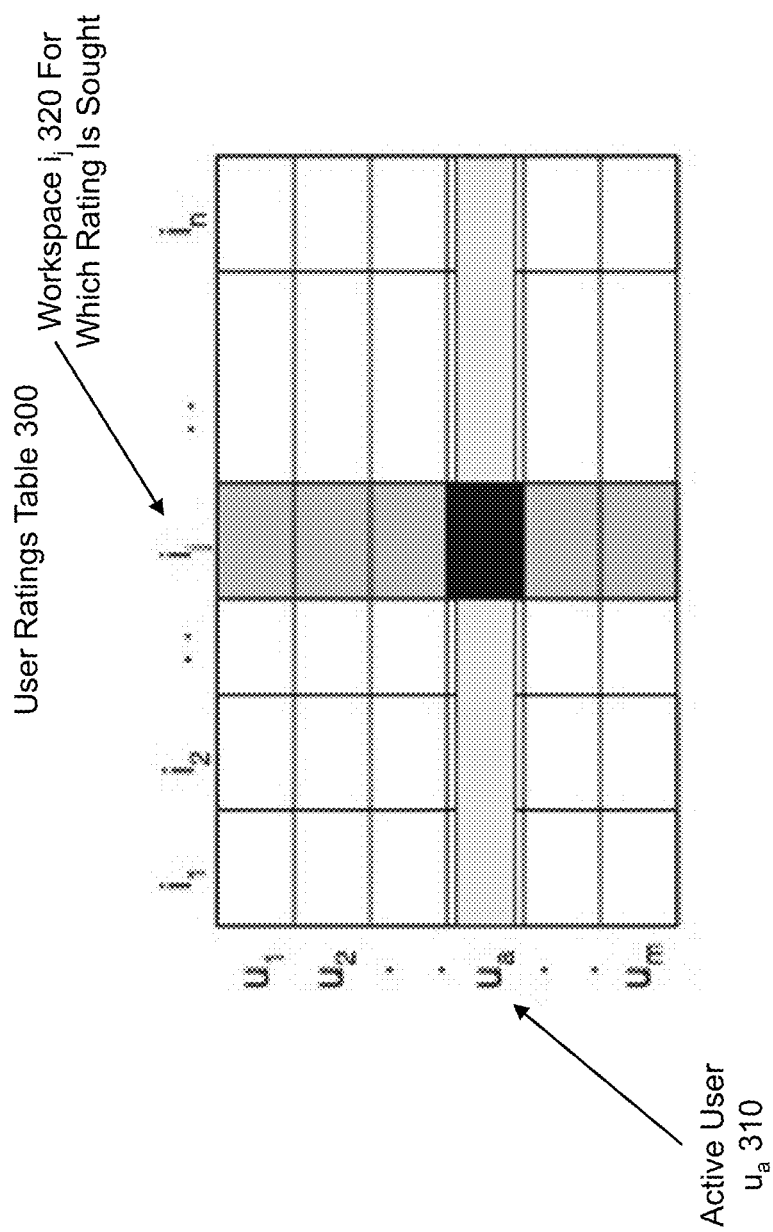
FIG. 3 illustrates an exemplary user ratings table, according to at least one embodiment.

FIG. 3 illustrates an exemplary user ratings table 300, according to at least one embodiment. Generally, the exemplary user ratings table 300 aggregates the workspace ratings 210 from the given user and the workspace ratings 220 from other users in a single table. As shown in FIG. 3, each column of the exemplary user ratings table 300 corresponds to a different workspace, and each row of the exemplary user ratings table 300 corresponds to a different user. Thus, a given element of the exemplary user ratings table 300 indicates the user rating of a given workspace by a given user. It is noted that row a in FIG. 3 corresponds to a given active user 310 for which a workspace recommendation is being generated and column j of the user ratings table 300 corresponds to a given workspace 320 for which a rating is being sought.

Figure 4:
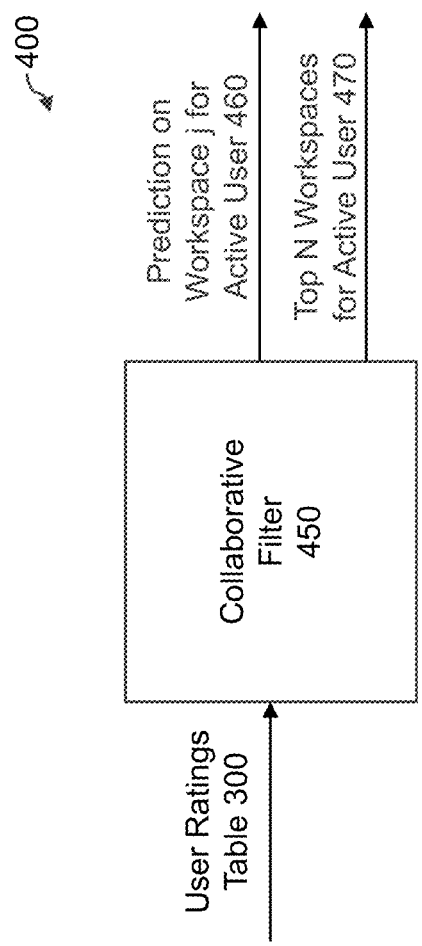
FIG. 4 illustrates an exemplary implementation of the workspaces of similar user recommender of FIG. 2 as a collaborative filter, according to an embodiment of the disclosure.

FIG. 4 illustrates an exemplary implementation 400 of the workspaces of similar users recommender 270 of FIG. 2 as a collaborative filter 450, according to an embodiment of the disclosure. As shown in FIG. 4, the user ratings table 300 of FIG. 3 is applied to the collaborative filter 450, which generates a prediction 460 on workspace j for the given active user, and optionally, a top N list of available workspaces 470 for the given active user. In some embodiments, the generated top N list of available workspaces 470 is based on the past ratings of the given active user and preferences of similar users.

The exemplary collaborative filter 450 may be implemented, for example, using the techniques described in Prem Melville and Vikas Sindhwani, "Recommender Systems," in Encyclopedia of Machine Learning (Springer, Claude Sammut and Geoffrey Webb (Eds), 2010), incorporated by reference herein in its entirety.

One or more embodiments of the disclosed techniques for generating workspace recommendations based on prior user ratings of selected workspaces, as well as other similar selections, automatically provide a given user with a list of available workspaces ordered by the likelihood that the given user will give them a high rating.

In one exemplary implementation, an enterprise can employ the following steps to apply the disclosed solution for generating workspace recommendations for a given user based on prior user ratings of selected workspaces by the given user, as well as other similar selections:

above-described weighted scores can be calculated every day, for example, at night;

obtain a list of available workspaces;

generate ordered list of available workspaces, ranked by the weighted scores generated by the workspace recommendation system 100 of FIG. 2;

present given user with a top N list of workspaces; and for exploration, e.g., suggesting options outside the regular preferences of the given user, an exploration coefficent can be chosen by the given user. For example, for a top-5 list, a rate of 1:4 exploration vs. exploitation can be employed. In this case, one exploration workspace can be selected randomly or according to a predefined strategy that the company is seeking to promote, and replace the workspace having the lowest weighed score in the top-5 list seat with the one exploration workspace.

Figure 5:
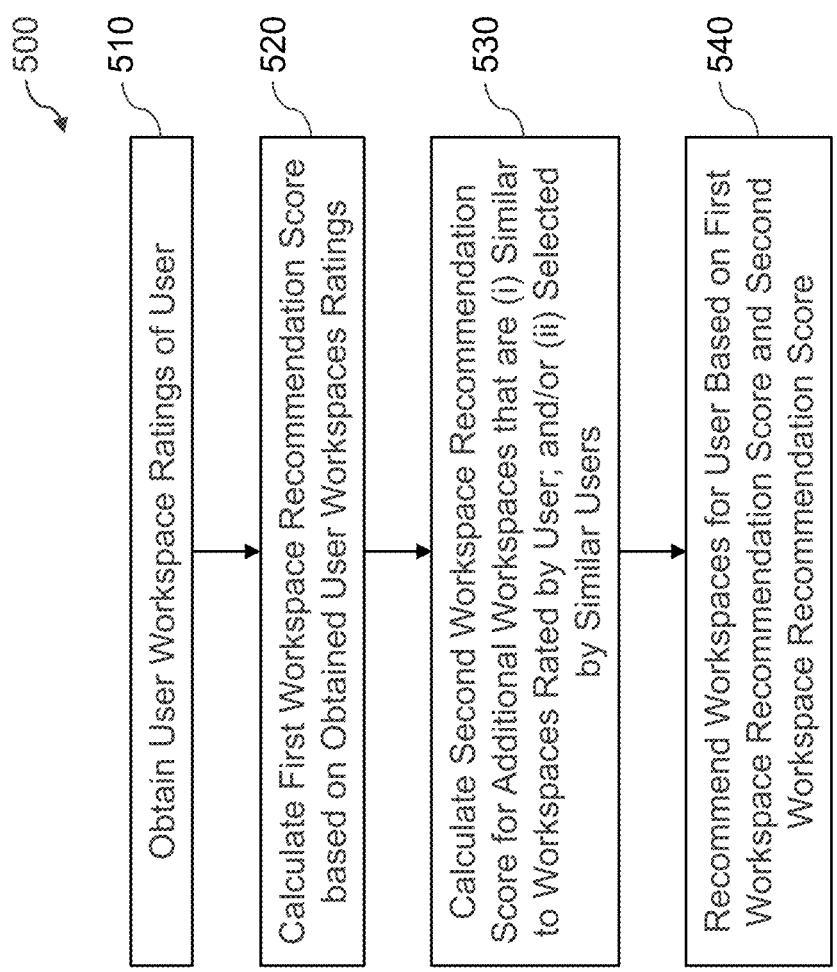
FIG. 5 is a flow chart illustrating an exemplary implementation of a workspace recommendation process, according to one embodiment of the disclosure.

FIG. 5 is a flow chart illustrating an exemplary implementation of a workspace recommendation process 500, according to one embodiment of the disclosure. As shown in FIG. 5, the exemplary workspace recommendation process 500 initially obtains one or more user workspace ratings that a user previously provided for one or more workspaces during step 510. Thereafter, a first workspace recommendation score for at least some of the workspaces that the user previously rated is calculated during step 520, based on the obtained one or more user workspaces ratings.

The exemplary workspace recommendation process 500 then calculates a second workspace recommendation score during step 530 for one or more additional workspaces that are: (i) similar to workspaces previously rated by the user, based on a predefined workspace similarity metric, and/or (ii) selected by one or more similar users, based on a predefined user similarity metric.

Finally, the exemplary workspace recommendation process 500 recommends one or more workspaces for the user during step 540 based on the first workspace recommendation score and/or the second workspace recommendation score.

Figure 6:
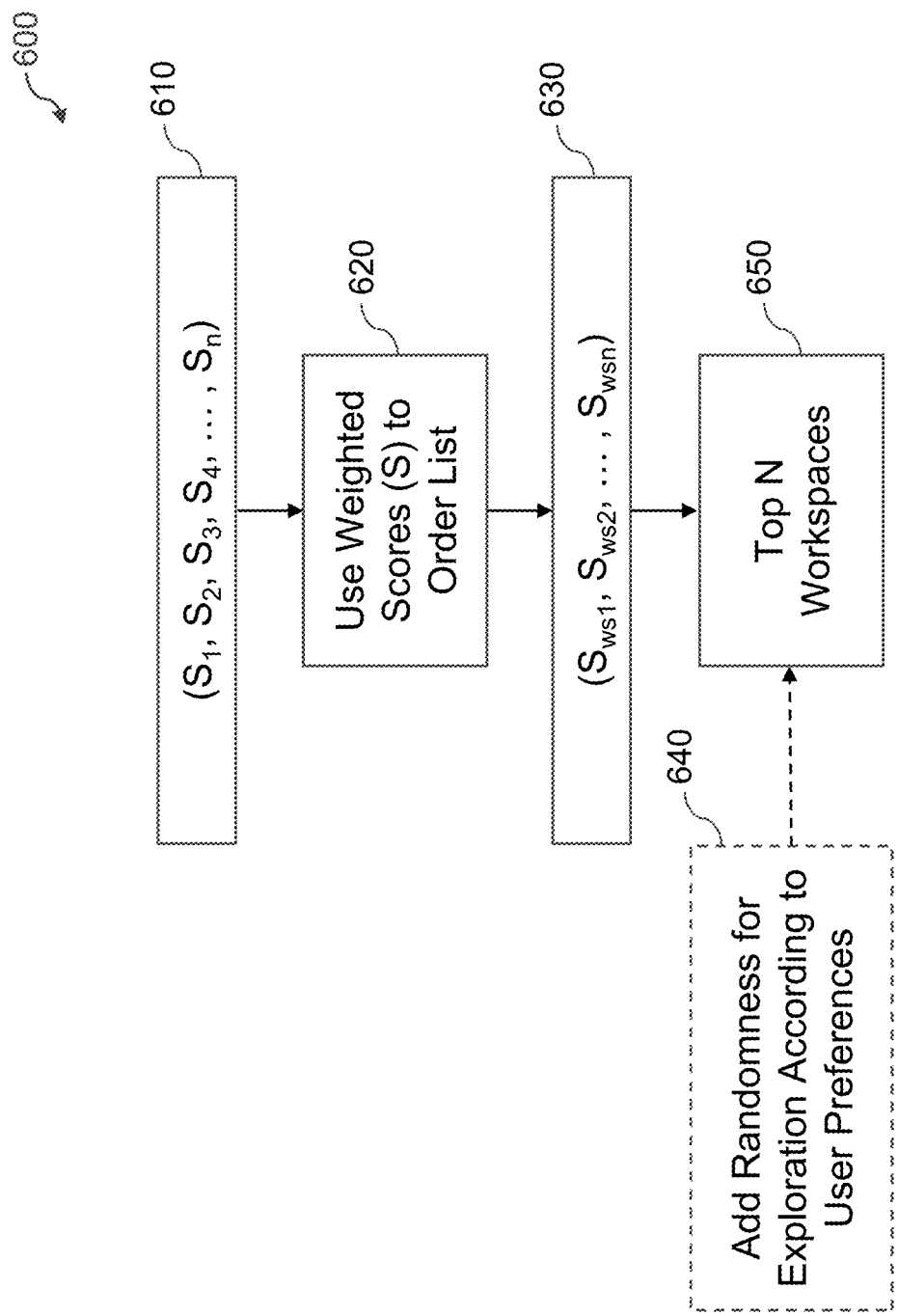
FIG. 6 is a flow chart illustrating an exemplary implementation of a workspace recommendation process, according to one alternate embodiment of the disclosure.

FIG. 6 is a flow chart illustrating an exemplary implementation of a workspace recommendation process 600, according to one alternate embodiment of the disclosure. As shown in FIG. 6, the exemplary workspace recommendation process 600 initially obtains a set of weighted scores, $S_1$ through $S_n$, assigned to corresponding workspaces during step 610. The workspace recommendation process 600 then uses the weighted scores, S, during step 620 to order the list of workspaces, as shown in step 630.

A top N list of workspaces is presented to the user during step 650. In addition, randomness can optionally be added to the top N list of workspaces during step 640, according to user preferences. For example, as indicated above, for a top-5 list, a rate of 1:4 of exploration vs. exploitation can be employed. In this case, one exploration workspace can be selected randomly or according to a predefined strategy that the company is seeking to promote during step 640, and the workspace having the lowest weighed score in the top-5 list seat can be replaced with the one exploration workspace.

Among other benefits, the disclosed workspace recommendation techniques allow employers to permit workers to work where they want, which helps in recruiting the best talent from everywhere in the country (if not the world). For example, generation Y workers are known to be extremely smart and technology-savvy. Such generation Y workers are often continuously plugged in through their smartphones, laptops and other devices and can basically perform their jobs anywhere. This generation also likes to job-hop and they are often on the lookout for the most appealing opportunities, preferably at a company that allows most self-fulfillment and maximum flexibility at the same time. Companies aiming to appeal to this profile of workers need to have updated policies regarding work location. Some of these new work forms is "hoteling" whereby employees must reserve a workspace every day, and "beach toweling" whereby employees do not even reserve a workspace but instead must claim the space they want as they come in.

One or more aspects of the present disclosure recognize that different workers have different preferences for an ideal working environment that allow them to reach their full potential and to become more productive. To achieve this goal, workspace assignment must be personalized according to employee declarations based on past experiences of good and bad locations. By learning and predicting individual preferences and assigning workspaces accordingly, workspace arrangements can also reflect the company strategy. For example, if one company goal is to create more collaboration across departments, some of the workspace suggestions will refer workers to locations removed from their immediate teammates and colleagues.

As noted above, financially, the business case for not having a physical office that supports an entire workforce is clear, resulting in less overhead. In addition, the cost savings provided by the disclosed techniques for generating workspace recommendations based on prior user ratings of selected workspaces, as well as other similar selections, also extend to the workers who save significant money each year on commuting costs.

In one or more embodiments, the disclosed techniques for generating workspace recommendations based on prior user ratings of selected workspaces, as well as other similar selections, employ machine learning algorithms on historical ratings of employees for workspaces they experienced, instead of coming up with suggestions manually (which can create huge overhead at scale). The disclosed solution suggests the best options available with regard to different workspace attributes (e.g., location, department, open space vs. office space and more). The system initially learns the individual employee preferences, at first based on a questionnaire the employee answers in some embodiments, and later by worker ratings of the provided suggestions. Over time, the predictions become more and more accurate. Once the learning phase is over, the disclosed workspace recommendation solution can integrate suggestions based on the learned behavior (e.g., exploitation) along with suggestions aligned with a company strategy (e.g., exploration). This allows the employee to experience workspaces that the employee would not normally choose.

One or more embodiments of the disclosure provide improved methods, apparatus and computer program products for generating workspace recommendations based on prior user ratings of selected workspaces, as well as other similar selections. The foregoing applications and associated embodiments should be considered as illustrative only, and numerous other embodiments can be configured using the techniques disclosed herein, in a wide variety of different applications.

It should also be understood that the disclosed workspace recommendation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for generating workspace recommendations based on prior user ratings of selected workspaces, as well as other similar selections may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based workspace recommender engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based workspace recommender platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
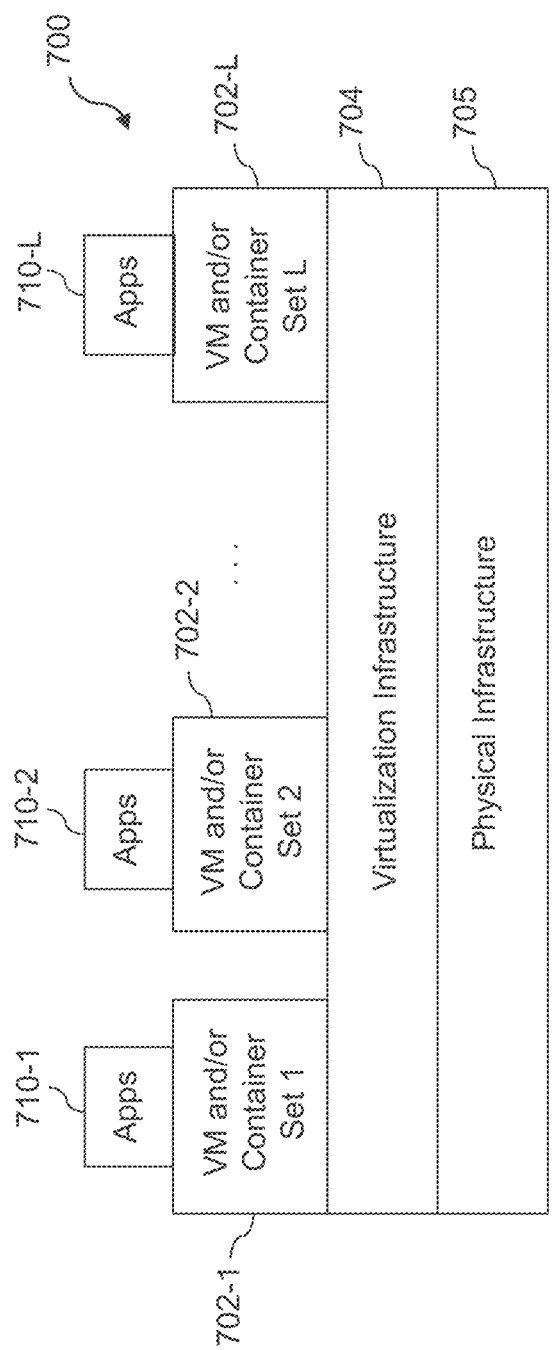
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the workspace recommendation system 100 of FIGS. 1 and 2. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide workspace recommender functionality of the type described above for one or more processes running on a given one of the VMs. For example, each of the VMs can implement workspace recommender control logic and associated workspace scoring techniques for providing workspace recommender functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide workspace recommender functionality of the type described above for one or more processes running on different ones of the containers. For example, a container host device supporting multiple containers of one or more container sets can implement one or more instances of workspace recommender control logic and associated workspace scoring for use in generating workspace recommendations.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers. The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
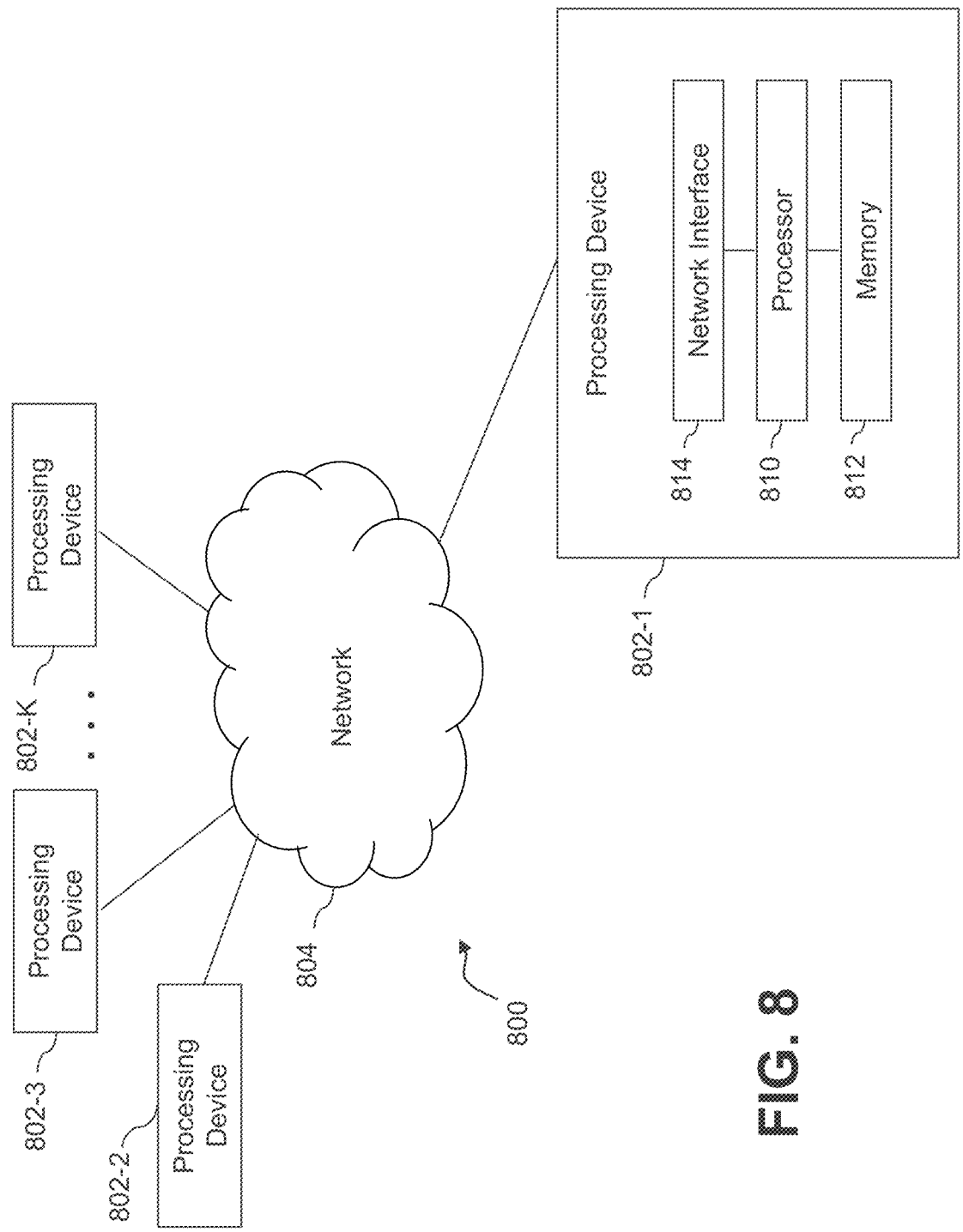
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used.

For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining one or more user workspace ratings for one or more workspaces from a first user and one or more additional users;

calculating a first workspace recommendation score for at least some of the workspaces that the first user previously rated based on the obtained one or more user workspaces ratings, wherein the first workspace recommendation score takes into account a number of times that the first user previously rated a given workspace;

calculating at least a second workspace recommendation score, using at least one machine learning model, for one or more additional workspaces not previously rated by the first user that are one or more of: (i) similar to workspaces previously rated by the first user, based on a predefined workspace similarity metric that evaluates a pairwise workspace similarity score between two workspaces based at least in part one or more attributes of the two workspaces, and (ii) selected by one or more similar users of the one or more additional users, based on a predefined user similarity metric that evaluates a pairwise user similarity score between the first user and each of the one or more additional users, wherein the one or more additional workspaces not previously rated by the first user are identified using one or more collaborative filters, and wherein the at least one machine learning model is trained using historical workspace ratings from one or more of the first user and the one or more additional users;

automatically recommending one or more workspaces for the first user based at least in part on the first workspace recommendation score and the second workspace recommendation score; and updating the at least one machine learning model using at least one rating, from the first user, of one or more of the one or more automatically recommended workspaces;

wherein the method is performed by at least one processing device comprising a processor coupled to a memory.

2. The method of claim 1, wherein the one or more workspaces comprise one or more of a seat, a desk, a table and a room.

3. The method of claim 1, wherein the first workspace recommendation score for at least some of the workspaces that the first user previously rated is further based on one or more of a number of times the first user selected a given workspace, an average number of times the first user selected different workspaces, and an average score that the first user previously assigned the given workspace.

4. The method of claim 1, wherein the second workspace recommendation score for the one or more additional workspaces that are similar to workspaces previously rated by the first user evaluates workspaces having a first workspace recommendation score above a predefined threshold and identifies the one or more additional workspaces using the predefined workspace similarity metric.

5. The method of claim 4, wherein the predefined workspace similarity metric comprises a Jaccard similarity using one or more attributes of the workspaces.

6. The method of claim 1, wherein the predefined user similarity metric employs a Pearson correlation.

7. The method of claim 1, wherein the recommending one or more workspaces for the first user comprises providing a list of available workspaces sorted based on one or more of the first workspace recommendation score and the second workspace recommendation score.

8. The method of claim 1, wherein the first workspace recommendation score leverages workspaces previously rated by a given user and the second workspace recommendation score explores different workspaces not previously rated by the given user.

9. A computer program product, comprising a tangible machine-readable storage medium having encoded therein executable code of one or more software programs, wherein the one or more software programs when executed by at least one processing device perform the following steps:

obtaining one or more user workspace ratings for one or more workspaces from a first user and one or more additional users;

calculating a first workspace recommendation score for at least some of the workspaces that the first user previously rated based on the obtained one or more user workspaces ratings, wherein the first workspace recommendation score takes into account a number of times that the first user previously rated a given workspace;

calculating at least a second workspace recommendation score, using at least one machine learning model, for one or more additional workspaces not previously rated by the first user that are one or more of: (i) similar to workspaces previously rated by the first user, based on a predefined workspace similarity metric that evaluates a pairwise workspace similarity score between two workspaces based at least in part one or more attributes of the two workspaces, and (ii) selected by one or more similar users of the one or more additional users, based on a predefined user similarity metric that evaluates a pairwise user similarity score between the first user and each of the one or more additional users, wherein the one or more additional workspaces not previously rated by the first user are identified using one or more collaborative filters, and wherein the at least one machine learning model is trained using historical workspace ratings from one or more of the first user and the one or more additional users;

automatically recommending one or more workspaces for the first user based at least in part on the first workspace recommendation score and the second workspace recommendation score; and updating the at least one machine learning model using at least one rating, from the first user, of one or more of the one or more automatically recommended workspaces.

10. The computer program product of claim 9, wherein the second workspace recommendation score for the one or more additional workspaces that are similar to workspaces previously rated by the first user evaluates workspaces having a first workspace recommendation score above a predefined threshold and identifies the one or more additional workspaces using the predefined workspace similarity metric.

11. The computer program product of claim 9, wherein the predefined user similarity metric employs a Pearson correlation.

12. The computer program product of claim 9, wherein the first workspace recommendation score leverages workspaces previously rated by a given user and the second workspace recommendation score explores different workspaces not previously rated by the given user.

13. The computer program product of claim 9, wherein the recommending one or more workspaces for the first user comprises providing a list of available workspaces sorted based on one or more of the first workspace recommendation score and the second workspace recommendation score.

14. An apparatus, comprising:
a memory; and
at least one processing device, coupled to the memory, operative to implement the following steps:

obtaining one or more user workspace ratings for one or more workspaces from a first user and one or more additional users;

calculating a first workspace recommendation score for at least some of the workspaces that the first user previously rated based on the obtained one or more user workspaces ratings, wherein the first workspace recommendation score takes into account a number of times that the first user previously rated a given workspace;

calculating at least a second workspace recommendation score, using at least one machine learning model, for one or more additional workspaces not previously rated by the first user that are one or more of: (i) similar to workspaces previously rated by the first user, based on a predefined workspace similarity metric that evaluates a pairwise workspace similarity score between two workspaces based at least in part one or more attributes of the two workspaces, and (ii) selected by one or more similar users of the one or more additional users, based on a predefined user similarity metric that evaluates a pairwise user similarity score between the first user and each of the one or more additional users, wherein the one or more additional workspaces not previously rated by the first user are identified using one or more collaborative filters, and wherein the at least one machine learning model is trained using historical workspace ratings from one or more of the first user and the one or more additional users;

automatically recommending one or more workspaces for the first user based at least in part on the first workspace recommendation score and the second workspace recommendation score; and updating the at least one machine learning model using at least one rating, from the first user, of one or more of the one or more automatically recommended workspaces.

15. The apparatus of claim 14, wherein the second workspace recommendation score for the one or more additional workspaces that are similar to workspaces previously rated by the user, evaluates workspaces having a first workspace recommendation score above a predefined threshold and identifies the one or more additional workspaces using the predefined workspace similarity metric.

16. The apparatus of claim 14, wherein the predefined user similarity metric employs a Pearson correlation.

17. The apparatus of claim 14, wherein the recommending one or more workspaces for the first user comprises providing a list of available workspaces sorted based on one or more of the first workspace recommendation score and the second workspace recommendation score.

18. The apparatus of claim 14, wherein the first workspace recommendation score leverages workspaces previously rated by a given user and the second workspace recommendation score explores different workspaces not previously rated by the given user.

19. The computer program product of claim 9, wherein the first workspace recommendation score for at least some of the workspaces that the first user previously rated is further based on one or more of a number of times the first user selected a given workspace, an average number of times the first user selected different workspaces, and an average score that the first user previously assigned the given workspace.

20. The apparatus of claim 14, wherein the first workspace recommendation score for at least some of the workspaces that the first user previously rated is further based on one or more of a number of times the first user selected a given workspace, an average number of times the first user selected different workspaces, and an average score that the first user previously assigned the given workspace.

* * * * *

UNITED STATES PATENT AND TRADEMARK OFFICE
CERTIFICATE OF CORRECTION

PATENT NO. : 11,361,366 B2
APPLICATION NO. : 16/589349
DATED : June 14, 2022
INVENTOR(S) : Gaber et al.

It is certified that error appears in the above-identified patent and that said Letters Patent is hereby corrected as shown below:

In the Claims

Column 12, Line 11, in Claim 1, replace "workspaces based at least in part one or more attributes" with -- workspaces based at least in part on one or more attributes --

Column 13, Line 22, in Claim 9, replace "workspaces based at least in part one or more attributes" with -- workspaces based at least in part on one or more attributes --

Column 14, Line 18, in Claim 14, replace "workspaces based at least in part one or more attributes" with -- workspaces based at least in part on one or more attributes --

Signed and Sealed this
Twentieth Day of September, 2022

Katherine Kelly Vidal
*Director of the United States Patent and Trademark Office*